United States Patent [19]
Cross et al.

[11] 3,844,762
[45] Oct. 29, 1974

[54] PHENYLNITRAMINE HERBICIDES

[75] Inventors: Barrington Cross, Rocky Hill; William Henry Gastrock, Hightstown, both of N.J.

[73] Assignee: American Cyanamid Company, Stanford, Conn.

[22] Filed: May 11, 1971

[21] Appl. No.: 142,393

[52] U.S. Cl. ................................................ 71/121
[51] Int. Cl. ............................................ A01n 9/20
[58] Field of Search ............................. 71/121, 125

[56] References Cited
UNITED STATES PATENTS
3,641,042  2/1972  Ayad ..................................... 71/94

OTHER PUBLICATIONS
Jones et al., J. Sci. Food Agric., 5, 38 (1954).
Templeman, Proc. Brit. Weed Control Conf., 1, 3 (1954).

*Primary Examiner*—James O. Thomas, Jr.
*Attorney, Agent, or Firm*—H. G. Jackson

[57] ABSTRACT

The present invention relates to a novel method for controlling undesirable plant species by applying to the foliage of said undesirable plants or soil containing seeds of said undesirable plants a herbicidally effective amount of a compound selected from the group consisting of 3-chlorophenylnitramine and the phenylnitramines having the formula:

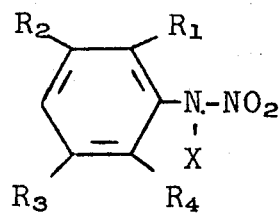

wherein the R groups: $R_1$, $R_2$, $R_3$, and $R_4$ each represent a member selected from the group consisting of hydrogen, halogen, loweralkyl, haloloweralkyl, carboxy and nitro, provided that at least two of said R groups are substituents other than hydrogen; X is a member selected from the group consisting of hydrogen, loweralkyl, loweralkoxyloweralkyl, aralkyl and the N-alkali metal, alkaline earth metal and N-ammonium derivatives; provided that where an R group is carboxy, X is hydrogen.

8 Claims, No Drawings

PHENYLNITRAMINE HERBICIDES

This invention relates to the use of certain substituted phenylnitramines for controlling undesirable plant species. More particularly, it relates to the control of undesirable plant species by applying to the foliage of said plants or to the soil containing the seeds of said plants a herbicidally effective amount of a compound selected from the group consisting of 3-chlorophenylnitramine, certain di-, tri-, and tetra-substituted phenylnitramines and mixtures thereof.

A variety of nitramines have been employed as the active ingredients in a variety of pesticidal and plant growth regulating compositions, as shown, for example, in U.S. Pat. Nos. 3,396,006, 3,436,417, 3,356,483; South African Pat. Nos. 62/3691 and 63/4983; British Pat. Nos. 935,504 and 935,671; and, such publications as those by R. L. Jones, T. P. Metcalfe and W. A. Sexton in J. Sci. Food Agric., 5, 38(1954) and W. G. Templeman, Proc. Brit. Weed Control Conf., 1, 3(1954).

The publications by Jones et al. and Templeman describe the use of various aromatic nitramines in herbicidal compositions. Jones reports that unsubstituted aromatic nitramines are generally unstable substances which readily undergo rearrangement with entry of the nitro group into the benzene ring. He further found, however, that by appropriately substituting various positions in the benzene ring stability could be achieved. This was generally effected by employing a four substituent together with one or more other substituents. Even in the case of stable aromatic nitramines, however, the compounds were found to have unsatisfactorily low toxicities compared to the conventional herbicide, 2,4-dichlorophenoxy acidic acid (2,4-D). Templeman investigated the use of 2,4,6-tribromophenylnitramine as a preemergence herbicide applied at a rate of 10 and 15 pounds per acre against chickweed and groundsel. While he found that the compound had some activity, he concluded that it could not be practically employed due to its lack of selectivity, injury caused to crops and the intrinsic difficulty in employing it for preemergence applications.

Accordingly, it is an object of the present invention to provide novel herbicidal methods. Another object is to provide herbicidal processes in which the active ingredient is storage stable. A further object is to provide herbicidal methods employing active ingredients having high herbicidal selectivity and toxicity. An additional object is to provide herbicidal methods for both the postemergence and preemergence control of undesirable plants. These and other objects and advantages of the present invention will become apparent from the detailed description provided hereinbelow.

It has now been found that one or more of these objects and advantages can be obtained by applying a herbicidally effective amount of a compound selected from the group consisting of 3-chlorophenylnitramine and the phenylnitramines having the formula:

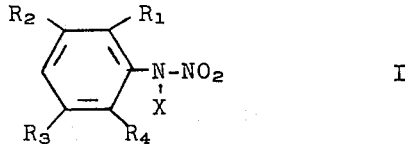

wherein the R groups: $R_1$, $R_2$, $R_3$, and $R_4$ each represent a member selected from the group consisting of hydrogen, halogen, e.g., chloro, fluoro, bromo and iodo, loweralkyl $C_1$-$C_4$, e.g., methyl, ethyl, n-propyl, n-butyl, t-butyl, carboxy and nitro; provided that at least two of said R groups are substituents other than hydrogen; and, X is a member selected from the group consisting of hydrogen, loweralkyl $C_1$-$C_4$, loweralkoxyloweralkyl wherein the hydrocarbon portions of said group are both in the range of $C_1$-$C_4$, arloweralkyl wherein the loweralkyl portion of said group is in the range of $C_1$-$C_4$, alkali metals, e.g., metals from the group consisting of lithium, potassium and sodium, alkaline earth metals, for example, calcium, strontium, and barium; and the N-ammonium derivatives; provided that where an R group is carboxy, X is hydrogen.

The following are illustrative of specific compounds within the scope of the present invention. In each case, the compounds are named as phenylnitramines; however, they could alternatively be designated as N-nitroanilines and their N-metal and ammonium derivatives: 3-chlorophenylnitramine, 2,6-dibromophenylnitramine, 2,6-dichlorophenylnitramine, 3,5-dichlorophenylnitramine, 2,5-dichlorophenylnitramine, 2,3,5,-6-tetrachlorophenylnitramine, 2-methyl-5-trifluoromethylphenylnitramine, 3-chloro-2-methylphenylnitramine, 5-chloro-2-methylphenylnitramine, 2,3-dichlorophenylnitramine, 3,5-dichlorophenylnitramine, 2,6-dibromophenylnitramine N-barium derivative trihydrate, 2,6-dimethylphenylnitramine, 2,6-diethylphenylnitramine, 2-chloro-6-methylphenylnitramine, 2,3,5,6-tetrachlorophenylnitramine N-barium derivative, 2,6-dibromo-N-methylphenylnitramine, 2,6-dibromo-N-isopropylphenylnitramine, 2,6-dibromo-N-(methoxymethyl)phenylnitramine, 2,6-dibromo-N-propylphenylnitramine, 2,5-dichloro-3-nitraminobenzoic acid, 2,6-dinitrophenylnitramine, 2,-3,5,6-tetrabutylphenylnitramine, 2,6-dipropylphenylnitramine, 2,6-(4-bromobutyl)phenylnitramine, 2,6-(2,3-dichloroethyl)phenylnitramine, 2,6-dibromo-N-butylphenylnitramine, 2,6-dibromo-N-(ethoxybutyl)-phenylnitramine, 2,6-dibromo-N-(2-butoxyethyl)phenylnitramine, N-benzyl-2,6-dibromophenylnitramine, 2,6-dibromo-N-phenethylphenylnitramine, 2,6-dimethyl-N-(4-phenylbutyl)phenylnitramine, 2,6-dibromophenylnitramine N-sodium derivative, 2,6-dibromophenylnitramine N-lithium derivative, 2,6-dibromophenylnitramine N-potassium derivative, 2,6-dibromophenylnitramine N-strontium derivative and 2,6-dibromophenylnitramine N-ammonium derivative.

The substituted phenylnitramines of the present invention may be prepared by a variety of conventional procedures from known starting materials. The nitration of the appropriately substituted aniline with nitric acid is one such convenient method. This procedure may be schematically represented as follows:

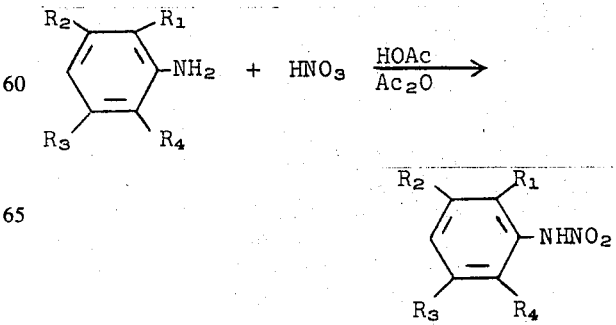

The above synthesis is conveniently carried out in a solvent, such as, acidic acid, preferably in the presence of a dehydrating agent, such as, acidic anhydride. Precipitation of the desired product can be effected by the addition of ice-water. Purification can be effected by conventional extraction procedures. The desired nitramines may be dissolved in chloroform, extracted therefrom with an aqueous solution of sodium carbonate from which precipitation is induced by the addition of hydrochloric acid. Alternatively, the chloroform may be evaporated and separation of the desired product from the side products effected by conventional procedures, such as, selective extraction, crystallization or chromatography.

An alternative to the above reaction scheme is a conversion of the appropriately substituted anilines to the corresponding nitramines by reacting the aniline with ethyl nitrate and butyl lithium in a solution of ethyl ether. Precipitation of the desired product may be induced by the addition of ice-water and hydrochloric acid.

The N-metal derivatives of the nitramines may be conveniently prepared by heating the appropriately substituted nitramine in an aqueous solution of sodium carbonate and the appropriate metal chloride salt.

The N-ammonium derivatives may be prepared by reacting the appropriately substituted phenylnitramine with aqueous ammonium hydroxide followed by isolation of the product by reduced pressure, low temperature evaporation.

The N-loweralkyl, N-loweralkoxyloweralkyl and N-arloweralkyl phenylnitramines of the present invention may be conveniently prepared by reacting the appropriately substituted phenylnitramines with the appropriate organo halide, such as, a loweralkyl iodide. The reaction may be conducted in the presence of a strong base, such as, sodium methoxide, to form the sodium salt of the phenylnitramine which displaces the halide to form the desired N-substituent. Alternatively, the reaction can be conducted in a tertiary organic amine, such as, triethylamine.

The phenylnitramines of Formula I may be used in the control of undesirable plant species by conventional postemergence and preemergence herbicide methods. Postemergence control is effected by applying one or more of the phenylnitramines to the foliage of the plant to be controlled. The preemergence herbicidal methods concern the application of one or more of the phenylnitramines into the soil containing the seeds of the undesired plants.

As in conventional herbicidal methods, it is generally preferred to employ the active ingredients in combination with conventional adjuvants, formulating aids and the like.

In postemergence applications the active compounds are generally prepared as wettable powders or emulsifiable concentrates, dispersed in water or in a relatively inexpensive organic solvent, such as deodorized kerosene, and sprayed on the plants for which control is desired.

For preemergence control, the active compounds may be incorporated into the soil prior to planting or they may be applied simultaneously with or following planting. In practice, the compounds are usually made up on granular carriers or in the form of dusts, dust concentrates, wettable powders or emulsifiable concentrates and applied to soils containing seeds of undesirable plants.

Granular formulations may be prepared by coating sorptive granules such as attaclay, kaolin, corn cobs or the like, or non-sorptive granules such as sand or limestone with from about 1 percent to about 15 percent by weight of the phenylnitramines.

Dust and dust concentrates are generally made up by grinding, in the case of dusts about 1 percent to about 15 percent or dust concentrates, about 15 percent to about 75 percent by weight of the phenylnitramine, with an inert pulverulent diluent such as attaclay, diatomaceous earth, fuller's earth or the like.

Wettable powders are usually prepared in the same manner as dust concentrates, but have admixed therein generally from about 1 percent to about 5 percent by weight of a dispersing agent such as the sodium salt of polymeric carboxylic acid and about 1 percent to about 5 percent by weight of a surfactant such as the oleic acid ester of sodium isothionate or sodium alkylnaphthalene sulfonate.

The emulsifiable concentrates may be prepared by admixing from about 10 percent to about 80 percent by weight of the selected phenylnitramine with from about 15 percent to about 80 percent by weight of a solvent such as methylisobutylketone, cyclohexanone or methylethylketone and from about 5 percent to about 10 percent by weight of an anionic-nonionic emulsifier such as Mal–77L (by Wm. Cooper and Nephors). In use, the wettable powders and emulsifiable concentrates are diluted in water and applied as dilute sprays, usually at from about 20 to about 400 gallons per acre. Application is sufficient to provide from about 0.5 to about 15 and preferably from about 0.5 to about 10 pounds per acre of active material.

In the case of preemergence and postemergence treatment of broad leaf weeds, application of such phenylnitramines as 2,6-dibromophenylnitramine, 2,3,5,6-tetrachlorophenylnitramine and 3-chlorophenylnitramine at rates of from about 0.5 to about 4 pounds per acre is effective to achieve the desired weed control.

The synthesis of the phenylnitramines of Formula I and the herbicidal processes of the present invention are further demonstrated by the following examples which are not to be taken as limitative thereof. In each case, the parts and percentages used herein are by weight unless otherwise indicated.

EXAMPLES 1–10

Preparation of Phenylnitramines

To a cooled (10°–20°C.) solution containing an appropriately substituted aniline (0.1 mole) in glacial acetic acid (100–500 ml.) is added dropwise, with ice-water cooling and stirring during 15–30 minutes, 90 percent nitric acid (15–16 ml., 0.28–0.3 mole). In many reactions, the nitrate salt precipitates out. After 15 minutes to 1 hour, acetic anhydride (15 ml.) is added dropwise with stirring and the temperature allowed to attain 18°–25°C. The reaction mixture darkens and becomes homogeneous, at which point the mixture is poured into ice-water (1:1, 1 liter). The resulting precipitate is filtered, water washed and dissolved in aqueous 10 percent sodium carbonate. The acidic filtrate is extracted with chloroform (2 x 200 ml.) and the chloroform layer is successively washed with water (2 × 200 ml.). The chloroform layer is extracted with 10 percent aqueous sodium carbonate and both of the above carbonate solutions are combined, chloroform washed, cooled at 10°C. and acidified with ice-cold 2N hydrochloric acid to precipitate the desired phenylnitramine product. After rapid filtration, the solid phenylnitramine is washed with cold water, dried in vacuo and recrystallized from an appropriate solvent. Alternatively, the above chloroform solution may be evaporated to dryness to give a mixture of the desired product, the unreacted aniline and side products, such as, acetanilides. The impurities may be separated by conventional procedures, such as, by extraction, selective crystallization, chromatography and the like.

Various substituted phenylnitramines prepared by the above general procedure are set forth in Table I below. In each case, the substituents on the aniline starting material, the crystallization solvent, together with the desired products' elemental analysis, melting point or decomposition temperature (dec.) and yield obtained are set forth.

water washed, and vacuum dried to yield 21.6 g. of the desired product having a melting point of 107°–109°C. Crystallization of a 2 g. sample of the product from hexane affords 1.4 g. of purified product having a melting point of 109°–110.5°C. The filtrate from the first filtration above is chloroform extracted and the organic layer is successively washed with water (2 × 100 ml.) and 5 percent aqueous sodium carbonate. Acidification of the aqueous alkaline extract affords a further 3 g. of product, m.p. 108°–109°C. Total yield was 24.6 g. (83 percent) of the desired product having the following elemental analysis:

Anal. Calcd. for $C_6H_4N_2O_2Br_2$: C, 24.4; H, 1.4; N, 9.5; Br, 54.0. Found: C, 24.2; H, 1.4; N, 9.4; Br, 53.9.

The chloroform layer after base extraction is water washed, dried over anhydrous magnesium sulfate, fil-

TABLE I

| Ex. No. | Substituents | Crystallization Solvent | m.p. (°C.) | Yield % | Analysis Calculated | Found |
|---|---|---|---|---|---|---|
| 1 | 3-Cl | hexane-water | 94–94.9 (dec.) (94–96) | 23 | C 41.7<br>H 2.9<br>N 16.5<br>Cl 20.4 | C 41.7<br>H 3.0<br>N 16.2<br>Cl 20.3 |
| 2 | 2,6-di-Br | heptane | 108–109 (dec.) | 83 | C 24.4<br>H 1.4<br>N 9.5<br>Br 54.0 | C 24.2<br>H 1.4<br>N 9.4<br>Br 53.9 |
| 3 | 2,3-di-Cl | hexane | 58–60 | 83 | C 34.8<br>H 1.9<br>N 13.5<br>Cl 34.7 | C 35.1<br>H 2.1<br>N 13.6<br>Cl 34.5 |
| 4 | 2,6-di-Cl | water | 102–103 (dec.) | 69 | C 34.8<br>H 1.9<br>N 13.5<br>Cl 34.7 | C 34.8<br>H 2.1<br>N 13.3<br>Cl 34.5 |
| 5 | 3,5-di-Cl | hexane | 120–122 (dec.) | 63 | C 34.8<br>H 1.9<br>N 13.5<br>Cl 34.7 | C 34.6<br>H 2.0<br>N 13.3<br>Cl 34.1 |
| 6 | 2,5-di-Cl | hexane | 79–81 | 64 | C 34.8<br>H 1.9<br>N 13.5<br>Cl 34.7 | C 35.0<br>H 2.0<br>N 13.4<br>Cl 34.0 |
| 7 | 2,3,5,6-tetra-Cl | cyclohexane | 144–146 (dec.) | 84 | C 26.1<br>H 0.7<br>N 10.2<br>Cl 51.4 | C 25.5<br>H 0.5<br>N 9.9<br>Cl 51.4 |
| 8 | 2-Cl-5-$CF_3$ | cyclohexane | 50–51 | 51 | C 34.9<br>H 1.7<br>N 11.6<br>Cl 14.7<br>F 23.7 | C 34.9<br>H 1.8<br>N 11.6<br>Cl 14.6<br>F 23.9 |
| 9 | 2-$CH_3$-5-Cl | hexane | 25 | 1 | C 45.1<br>H 3.8<br>N 15.1<br>Cl 19.0 | C 43.4<br>H 3.8<br>N 15.5<br>Cl 19.4 |
| 10 | 3-Cl-2-$CH_3$ | hexane | 93.5–94 (dec.) | 2 | C 45.1<br>H 3.8<br>N 15.1<br>Cl 19.0 | C 44.8<br>H 3.8<br>N 15.3<br>Cl 19.5 |

EXAMPLE 11

Preparation of 2,6-Dibromophenylnitramine

To a well stirred ice-water cooled solution of 2,6-dibromoaniline (25.1 g., 0.1 mole) in a glacial acetic acid (350 ml.) at 18°C. is added dropwise 90 percent nitric acid (15 ml., 0.27 mole). After 30 minutes, acetic anhydride is added dropwise, and the solution is maintained at 18°–20°C. during 25 hours. The solution is poured into ice-water (1 liter), the solid filtered off, water washed, extracted with 5 percent aqueous sodium carbonate and this solution filtered. Acidification of the filtrate with ice-cold 2N hydrochloric acid affords an almost white solid, which is filtered off, icetered and evaporated to give a solid residue: 0.7 g. of the acetanilide side product. Purification was effected by crystallization from hexane-acetone giving 2,6-dibromoacetanilide having an m.p. of 204°–205°C. and the following elemental analysis:

Anal. Calcd. for $C_8H_7NOBr_2$: C, 32.8; H, 2.4; N, 4.8; Br, 54.6. Found: C, 32.7; H, 2.5; N, 4.6; Br, 54.5.

EXAMPLES 12–21

Preparation of 6-Chloro-3-Trifluoromethylphenylnitramine

To α, α, α-trifluoro-6-chloro-m-toluidine in glacial acetic acid (300 ml.) is added with stirring and cooling to 11°–15°C., 90 percent nitric acid (16 ml., 0.29 mole). After the addition, the reaction mixture is set aside for 1 hour at 15°C. Then acetic anhydride (20 ml.) is added and the solution allowed to attain 23°C. during 30 minutes. The now orange solution is poured onto ice-water (1 liter, 1:1) and this mixture is extracted with chloroform (500 ml.) and this layer water washed (200 ml.) and extracted with 10 percent aqueous sodium carbonate. Acidification gives 14.2 g., 59 percent of the desired product in the form of a white solid, which, after crystallization from cyclohexane, had a melting point of 50°–51°C. and the following elemental analysis:

Anal. Calcd. for $C_7H_4N_2O_2ClF_3$: C, 34.9; H, 1.7; N, 11.6; Cl, 14.7; F, 23.7. Found: C, 34.9; H, 1.8; N, 11.6; Cl, 14.6; F, 23.9.

The chloroform layer is evaporated to give the side product, 6'-chloro-α,α,α-trifluoro-m-acetotoluidine, in the form of a yellow solid, which on crystallization from methanol yields 5.1 g., 21 percent, m.p. 96°–97°C. and the following elemental analysis:

Anal. Calcd. for $C_9H_7NOClF_3$: C, 45.5; H, 3.0; N, 5.9; Cl, 14.9; F, 24.0. Found: C, 45.3; H, 2.9; N, 5.8; Cl, 14.8; F, 23.9.

The following compounds were prepared by the general procedure set forth above, substituting the appropriately substituted aniline for the α,α,α-trifluoro-6-chloro-m-toluidine employed therein: 2-chloro-6-trifluoromethylphenylnitramine; 2-bromo-6-chlorophenylnitramine; 2,6-diiodophenylnitramine; 2,3,6-tribromophenylnitramine; 2,3,6-trichlorophenylnitramine; 2,6-dichloro-3-methylphenylnitramine; 2,5-dichloro-6-methylphenylnitramine; 2-t-butyl-6-chlorophenylnitramine; 2,6-diisopropylphenylnitramine.

EXAMPLES 22–25

Preparation of 2,6-Dimethylphenylnitramine

In a nitrogen atmosphere, 24.7 percent n-butyllithium in benzene (25 ml., 0.097 mole) was added slowly to 2,6-xylidine (12.1 g., 0.1 mole) in dry ether (200 ml.) at −60°C. One hour after the addition, the solution is allowed to attain −10°C. and is then cooled to −50°C. Ethylnitrate (9.1 g., 0.1 mole) is added in ether (50 ml.), slowly with stirring. The reaction mixture is allowed to warm up, and at −25°C. the mixture is homogeneous, but at −18°C. a copious precipitate is formed. The mixture is set aside at 20°C. for 16 hours and then is poured into ice-water (100 ml.). The aqueous layer was separated and was then acidified with ice-cold 1N hydrochloric acid to give 9 g., 54 percent of crude product which on crystallization from hexane affords the desired product in the form of nearly white crystals having a melting point of 105.5°C.–106°C.

Following the above general procedure, substituting 2,6-diethylaniline for 2,6-xylidine and conducting the reaction in hexane yields 2,6-diethylphenylnitramine having a melting point of 73°–74°C. Also, substituting 2-chloro-6-methylaniline for 2,6-xylidine in the above procedure yields 2-chloro-6-methylphenylnitramine having a melting point of 68.5°–69.5°C. Further substituting 2,3,5,6-tetramethyl aniline for 2,6-xylidine yields 2,3,5,6-tetramethylphenylnitramine.

EXAMPLE 26

Preparation of 2,3,5,6-Tetrachlorophenylnitramine N-Barium Derivative 2,3,5,6-Tetrachloro-N-nitroaniline (13.75 g., 0.05 mole) is added to an aqueous solution of sodium carbonate (5.1 g., 0.05 mole) in water (500 ml.). The mixture is warmed to 100°C. and almost complete solution is obtained. The solution is rapidly filtered hot and poured into a boiling solution of $BaCl_2$ (30 g.) in water (500 ml.). A precipitate is formed immediately. A further 1 liter of boiling water is added and the resulting mixture is filtered hot. On cooling the filtrate, the desired product separates out in the form of white crystals having a melting point of 288°–289°C. Product yield is 11.9 g. (65 percent). The product had the following elemental analysis:

Anal. Calcd. for $BaC_{12}H_2N_4O_4Cl_8 \cdot 2 H_2O$: C, 20.0; H, 0.8; N, 7.8; Cl, 39.3; Ba, 19.1. Found: C, 19.6; H, 0.6; N, 7.5; Cl, 39.1; Ba, 19.4.

EXAMPLE 27

Preparation of 2,6-Dibromophenylnitramine N-Barium Derivative

In the general procedure of Example 26 employing 2,6-dibromophenylnitramine in lieu of the tetrachlorophenylnitramine used therein, the product 2,6-dibromophenylnitramine N-barium derivative trihydrate was prepared in 80 percent yield having an m.p. of 254°–256°C. (dec.) and the following elemental analysis:

Anal. Calcd. for $C_{12}H_6N_4O_4Br_4Ba \cdot 3 H_2O$: C, 18.5; H, 1.5; N, 7.2; Br, 40.9; Ba, 17.6. Found: C, 18.2; H, 1.6; N, 7.1; Br, 39.7; Ba, 18.5.

EXAMPLE 28

Preparation of 3-Chlorophenylnitramine Barium Derivative

The barium derivative of 3-chlorophenylnitramine was prepared employing the general procedure of Example 27, substituting 3-chlorophenylnitramine in lieu of the 2,6-dibromophenylnitramine used therein. The desired product was isolated in the form of a yellow solid, which, after crystallization from water, had an m.p. of 208°–209°C. (dec.) and the following elemental analysis:

Anal. Calcd. for $C_{12}H_8N_4O_4Cl_2Ba$: C, 30.0; H, 1.7; N, 11.6; Cl, 14.8; Ba, 28.6. Found: C, 29.2; H, 1.7; N, 11.9; Cl, 12.6; Ba, 26.5.

EXAMPLE 29

Preparation of 3,5-Dichloro-N-methyl-Phenylnitramine 3,5-Dichloro-N-nitroaniline (4 g., 0.019 mole), methanol (50 ml.), methyliodide (1.1 g., 0.007 mole) and sodium methoxide (2.73 g.) are heated under reflux during 8 hours. The reaction mixture is evaporated to dryness and the residue crystallized from methanol to yield 0.6 g. of the desired product, 38 percent, m.p. 94°–95°C., having the following elemental analysis:

Anal. Calcd. for $C_7H_6N_2O_2Cl_2$: C, 37.9; H, 2.7; N, 12.6; Cl, 32.1. Found: C, 38.1; H, 2.6; N, 12.6; Cl, 31.8.

EXAMPLE 30

Preparation of 2,6-Dibromo-N-methyl-phenylnitramine

To 2,6-dibromo-N-nitroaniline (3 g., 0.01 mole) in absolute methanol (50 ml.) is added sodium methoxide (1.1 g., 0.020 mole) and the mixture is warmed until complete solution is achieved. After cooling, methyliodide (10 ml.) is added and the solution brought to reflux during 3 hours.

The solution is cooled and poured into ice-water, made alkaline with 10 percent aqueous sodium carbonate and is filtered to yield 3.1 g. of the desired product in the form of a solid having an m.p. of 124°–127°C. Crystallization from hexane gives 1.90 g., 61 percent of the purified product having an m.p. of 128°–129°C. and the following elemental analysis:

Anal. Calcd. for $C_7H_6N_2O_2Br_2$: C, 27.13; H, 1.94; N, 9.40. Found: C, 27.04; H, 1.70; N, 8.87.

EXAMPLES 31-36

Preparation of N-Substituted Phenylnitramines

Following the general procedure of Example 30, a variety of N-substituted phenylnitramines were prepared by substituting the appropriately substituted aniline for the 2,6-dibromophenylnitramine used therein; and, the appropriate loweralkylhalide, loweralkoxyloweralkyl halide and arloweralkyl halide in lieu of the methyliodide used therein.

The reaction conditions, crystallization solvents, product yields, elemental analyses and melting points are presented in Table II below, together with the substituents in reference to phenylnitramines of the formula:

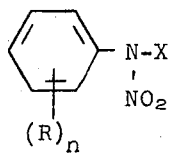

acetone/water mixtures in sufficient quantity to provide the equivalent of about 1.0 to 10 pounds per acre of active compound when applied to the plants through a spray nozzle operating at 30 p.s.i. for a predetermined time. After spraying, the plants are placed on greenhouse benches and are cared for in the usual manner, commensurate with conventional greenhouse practices. Two weeks after treatment, the seedling plants are examined and rated according to the Herbitoxicity Index provided below. The data obtained are reported in Table III.

Herbitoxicity Index

| | |
|---|---|
| 9 = 100% reduction in stand | s = severe injury |
| 9- = 1 or 2 stunted plants remaining | m = moderate injury |
| 8 = 85- <100% reduction in stand | t = trace to slight injury |
| 7 = 70- <85% reduction in stand | - = no test |
| 6 = 60- <70% reduction in stand | c = chlorosis |
| 5 = 50- <60% reduction in stand | g = growth retarded |
| 4 = 40- <50% reduction in stand | a = abnormal growth |
| 3 = 30- <40% reduction in stand | r = regrowth |
| 2 = 20- <30% reduction in stand | |
| 1 = 10- <20% reduction in stand | |
| 0 = no apparent effect | |

Plant Abbreviations

| | | |
|---|---|---|
| KO | = | Kochia |
| LA | = | Lambsquarters |
| Mu | = | Mustard |
| PI | = | Pigweed |
| BA | = | Barnyard grass |
| CR | = | Crabgrass |
| GRF | = | Greenfoxtail |
| WO | = | Wild Oats |
| COR | = | Corn |
| COT | = | Cotton |

TABLE II

| Ex. No. | (R)n | X | Reaction Conditions | Crystallization Solvent | Yield % | m.p. (°C.) | Analysis Calculated | Found |
|---|---|---|---|---|---|---|---|---|
| 31 | 3,5-diCl | -CH₃ | CH₃OH+CH₃I+NaOCH₃ | Methanol | 38 | 94–95 | C 37.9<br>H 2.7<br>N 12.6<br>Cl 32.1 | C 38.1<br>H 2.6<br>N 12.6<br>Cl 31.8 |
| 32 | 2,6-diBr | -CH₃ | CH₃OH+CH₃I+NaOCH₃ | n-Hexane | 61 | 128–129 | C 27.1<br>H 1.9<br>N 9.0 | C 27.0<br>H 1.7<br>N 8.9 |
| 33 | 2,6-diBr | -C₂H₅ | CH₃OH+C₂H₅I+NaOCH₃ | n-Hexane | 36 | 69–69.5 | C 29.7<br>H 2.4<br>N 8.7<br>Br 49.3 | C₁ 29.8<br>H₁ 2.6<br>N₁ 9.0<br>Br₁ 50.0 |
| 34 | 2,6-diBr | -i-C₃H₇ | CH₃OH+i-C₃H₇I+NaOCH₃ | n-Hexane | 23 | 67–68 | C 31.9<br>H 3.0<br>N 7.9 | C 30.2<br>H 2.5<br>N 8.4 |
| 35 | 2,6-diBr | -CH₂OCH₃ | C₆H₆+(C₂H₅)₃N+(CH₃)₂CO+<br>ClCH₂OCH₃ | n-Hexane | 32 | 64.5–67 | C 28.3<br>H 2.4<br>N 8.2<br>Br 47.0 | C 28.3<br>H 2.3<br>N 8.6<br>Br 47.5 |
| 36 | 2,6-diBr | -CH₂C₆H₅ | CH₃OH+C₆H₅CH₂Br-<br>+NaOCH₃ | Hexane | 32 | 85–86 | C₁ 40.4<br>H 2.6<br>N 7.2<br>Br 41.2 | C 40.7<br>H 2.5<br>N 7.5<br>Br 42.1 |

EXAMPLE 37

Postemergence Herbicidal Activity

The postemergence herbicidal activity of the compounds of the present invention is demonstrated by the following tests wherein a variety of monocotyledonous and dicotyledonous plants are treated with test compounds dispersed in aqueous-acetone mixtures. In the tests, seedling plants are grown in jiffy flats for about two weeks. The test compounds are dispersed in 50/50

Plant Abbreviations-Continued

| | | |
|---|---|---|
| SOY | = | Soybean |
| SB | = | Sugarbeets |
| TO | = | Tomato |
| WH | = | Wheat |
| AW | = | Aligator weed |
| BW | = | Bindweed |
| CT | = | Canada Thistle |
| JG | = | Johnson grass |
| NS | = | Nutsedge |
| QS | = | Quackgrass |

TABLE III

| Example number | Active ingredient | Rate, lb./acre | Perennial weeds | | | | | | Annual weeds | | | | | | | | | Crops | | | |
|---|---|---|---|---|---|---|---|---|---|---|---|---|---|---|---|---|---|---|---|---|---|
| | | | AW | BW | CT | JG | NS | OG | KO | LA | MU | PI | BA | CR | GRF | WO | Mi | COR | COT | SOY | SB |
| 37 | 2,6-dibromo phenyl NH–NO$_2$ | 9 | 5 | 9 | 9 | t | t | t | 9 | 9 | 9 | 9 | ta | ta | t | 8 | | | | | |
| 38 | 2,4,6-trichloro phenyl NH–NO$_2$ | 9 | m | 9 | 9 | m | t | t | 9 | 9 | 9 | 9 | 3 | t | t | 9 | | | | | |
| 39 | pentachloro C–Ba1/2·H$_2$O, NO$_2$ | 4 | | | | | | | 9 | 8 | 9 | 9 | 1 | 1 | 4a | 4a | | ta | sa | 9 | 9a |
| 40 | 2,6-dichloro phenyl NH–NO$_2$ | 9 | 5 | 9 | 9 | t | t | t | 9 | 9 | 9 | 9 | t | t | t | t | | | | | |
| 41 | 3,5-dichloro phenyl NH–NO$_2$ | 9 | 9 | 9 | 9 | t | gr | t | 9 | 9 | 9 | 9 | t | t | t | | | | | | |
| 42 | 2,4-dichloro phenyl NH–NO$_2$ | 4 | 5 | 9 | 5 | 0 | 0 | 0 | 9 | 9 | 9 | 9 | t | 3 | 9 | 9 | | | | | |
| 43 | 2,5-dichloro phenyl NH–NO$_2$ | 6 | t | 9 | 9 | m | 0 | 0 | 9 | 9 | 9 | 9 | t | t | t | t | | | | | |
| 44 | 3,5-dichloro phenyl NH–NO$_2$ | 9 | 9 | 9 | 9 | t | 9n | t | 9 | 9 | 9 | 9 | t | 3 | t | t | | | | | |
| 45 | 2,4-dichloro phenyl NH–NO$_2$ | 9 | t | 9 | 9 | t | t | t | 9 | 9 | 9 | 9 | t | t | t | t | | | | | |

TABLE III—Continued

| Example number | Active ingredient | Rate, lb./acre | Perennial weeds | | | | | | Annual weeds | | | | | | | | Crops | | | |
|---|---|---|---|---|---|---|---|---|---|---|---|---|---|---|---|---|---|---|---|---|
| | | | AW | BW | CT | JG | NS | OG | KO | LA | MU | PI | BA | CR | GRF | WO | Mi | COR | COT | SOY | SB |
| 46 | 2-Cl, 6-CH₃ phenyl–NH–NO₂ | 10 | 3 | 9 | 9 | 0 | 0 | 0 | 9 | 9 | 9 | 9 | t | t | 9 | 3 | | | | | |
| 47 | 2,6-(C₂H₅)₂ phenyl–NH–NO₂ | 10 | m | s | s | 0 | 0 | 0 | 9 | 9 | 9 | 9 | t | t | 3 | t | | | | | |
| 48 | 2,6-Br₂ phenyl–N(NO₂)–Ba½·2H₂O | 4 | | | | | | | 9 | 9 | 9 | 9 | t | t | t | t | | | | | |
| 49 | 2,6-(CH₃)₂ phenyl–NH–NO₂ | 1 | t | m | 9 | t | t | t | 8 | 9a | 9a | 4 | t | 0 | t | t | | | | | |
| 50 | 3-Cl, 5-CF₃ phenyl–NH–NO₂ | 6 | | | | | | | 0 | 9 | 9 | 0 | 0 | 0 | t | 0 | | | | | |
| 51 | 2,6-Br₂, 3-CH₃ phenyl–NH–NO₂ | 10 | ta | 9 | sa | 0 | 0 | 0 | ta | 9 | 9 | ma | 0 | t | t | 0 | | | | | |
| 52 | 2-Cl, 3-CH₃ phenyl–NH–NO₂ | 4 | | | | | | | 8 | 9– | 9 | mg | t | t | g | t | | | | | |
| 53 | 2,6-(NO₂)₂ phenyl–NH–NO₂ | 9 | | | | | | | 9– | tg | 9 | mg | t | t | 9– | t | | | | | |

EXAMPLES 54–71

Preemergence Herbicidal Activity

The preemergence herbicidal activity of the compounds of the invention is exemplified by the following tests in which the seeds of a variety of monocotyledonous and dicotyledonous plants are separately mixed with potting soil and planted on top of approximately one inch of potting soil in separate pint cups. After planting, the cups are sprayed with the selected aqueous-acetone solution containing test compound in sufficient quantity to provide the equivalent of about 3.0 to 15 pounds per acre of test compound per cup. The treated cups are then placed on greenhouse benches and cared for in accordance with greenhouse procedures. Two weeks after treatment, the tests are terminated and each cup is examined and rated according to the Herbitoxicity Index set forth in the previous example. The tabulated results of these tests establish the herbicidal proficiency of the test compounds and are reported in Table IV below.

TABLE IV

| Example number | Active ingredient | Rate, lb./acre | Annual weeds | | | | | | | | | Crops | | | |
|---|---|---|---|---|---|---|---|---|---|---|---|---|---|---|---|
| | | | KO | LA | MU | PI | BA | CR | GRF | WO | Mi | COR | COT | SOY | SB |
| 54 | 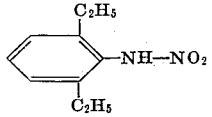 | 4 | 7 | 9– | 9 | 9– | 3a | 3 | 0 | 0 | | tg | 5g | 0 | 5a |
| 55 | 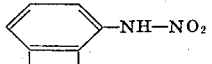 | 4 | 9 | 9 | 9 | 9 | 0 | 0 | 8g | 0 | | | | | |
| 56 | 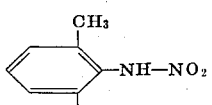 | 4 | 9 | 9 | 9a | 9 | 7a | 9– | 9 | 0 | | tg | 9 | 9– | 8 |
| 57 | 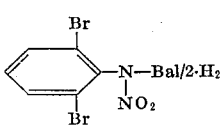 | 4 | 9 | 9 | 9 | 9 | ma | 3g | 3 | tg | | ma | 9 | 9a | 9 |
| 58 | 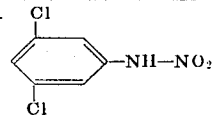 | 9 | 3 | 3 | 9 | 9– | 0 | tg | 3g | 0 | | 0 | 0 | 9 | 7 |
| 59 | 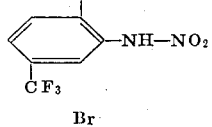 | 6 | 4 | 3g | 9 | 7g | 0 | 0 | 0 | 0 | | ta | 0 | t | 7g |
| 60 | 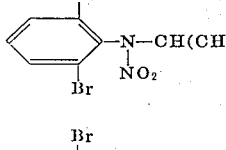 | 15 | 9 | 9 | 9 | 9 | ta | ta | ta | tg | | | | | |
| 61 | 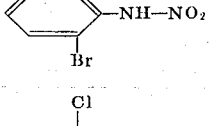 | 3 | 9 | 9 | 9 | 9 | tg | mg | mg | 0 | | tg | 9 | 9– | 9 |
| 62 | 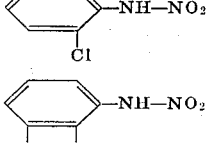 | 3 | 9 | 9 | 9 | 9 | ta | ta | 5a | tg | | ta | 9 | 9 | 9 |
| 63 | 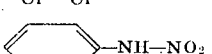 | 3 | 9 | 9 | 9 | 9 | 0 | 0 | ma | 0 | | 0 | 7 | 5g | 8g |
| 64 |  | 4 | 9 | 9 | 9 | 9 | 0 | 9 | 7g | 0 | | 0 | 0 | 0 | 0 |

Table IV – Continued

| Example number | Active ingredient | Rate, lb./acre | Annual weeds ||||||||| Crops ||||
|---|---|---|---|---|---|---|---|---|---|---|---|---|---|---|---|
| | | | KO | LA | MU | PI | BA | CR | GRF | WO | Mi | COR | COT | SOY | SB |
| 65 | 2,5-dichlorophenyl-NH-NO₂ | 4 | 9 | 9 | 9 | 9– | 0 | 0 | 0 | 0 | ..... | 0 | mg | 5g | 9– |
| 66 | 2-Cl,6-CH₃-phenyl-NH-NO₂ | 4 | 9 | 9 | 9 | 9 | 5a | 5 | 7a | 0 | ..... | tg | 9 | 9– | 9– |
| 67 | 2,3,5,6-tetrachlorophenyl-NH-NO₂ | 4 | 9 | 9 | 9 | 9 | ta | 0 | 0 | 0 | ..... | ta | 0 | 9– | 9 |
| 68 | 2,6-dibromophenyl-N(NO₂)-CH₂-CCH₃ | 15 | 8 | 8a | 9– | 8a | ta | 0 | ta | 3 | | | | | |
| 69 | 2,6-dibromophenyl-N(NO₂)-C₃H₉-n | 15 | 9 | 9– | 9 | 9 | ta | 0 | ta | 5 | | | | | |
| 70 | 2-COCH,4-Cl-phenyl-NH-NO₂ (with Cl) | 15 | 8g | 7a | 5a | 9 | 7 | 8g | 9– | 0 | | | | | |
| 71 | 2,3,5,6-tetrachlorophenyl-N(NO₂)-Ba1/2·H₂O | 4 | 3 | 9– | 8a | 9 | ta | 3 | 3 | 0 | ..... | 0 | 0 | 9 | 9 |

EXAMPLES 72–87

Preemergence Herbicidal Activity

The vast superiority of the phenylnitramines of the present invention over phenylnitramines substituted in the 4 position of the phenyl ring is evidenced by the following examples. In these experiments test compounds are prepared as 50/50 acetone/water solutions or dispersions and applied to soil in one pint containers planted with seeds of a variety of broadleaf weeds. Applications are at rates equivalent to from 0.50 to 3 pounds of test compound per acre and the procedures for completing the test and rating the activity of the various treatments are the same as set forth in Example 54. The data obtained for the compounds of the present invention and prior art 4-substituted phenyl nitramines are reported in Table V below.

TABLE V

| Ex. No. | Active ingredient | Rate, lb./acre | Annual weeds ||||
|---|---|---|---|---|---|---|
| | | | KO | LA | MU | PI |
| 72 | 2,6-dibromophenyl-NH-NO₂ | 1 / ½ | 9 / 8 | 9 / 8 | 9 / 9 | 9 / 8 |
| 73 | 2,6-dibromophenyl-N(NO₂)-Ba1/2·3H₂O | 1 / ½ | 9 / 8 | 8 / 6 | 9 / 8 | 8 / 7 |
| 74 | 2,4,6-tribromophenyl-NH-NO₂ | 1 / ½ | 4 / 0 | 1 / 0 | 8 / 5 | 4 / 0 |
| 75 | 4-cyano-2,6-dibromophenyl-NH-NO₂ | 1 | 0 | 0 | 0 | 4 |
| 76 | 4-CF₃-2,6-dibromophenyl-NH-NO₂ | 1 | 0 | 0 | 5 | 0 |
| 77 | 4-methyl-2,6-dibromophenyl-NH-NO₂ | 1 | 0 | 0 | 0 | 0 |
| 78 | 4-(CH₃NHCO)-2,6-dibromophenyl-NH-NO₂ | 4 | 0 | 0 | 0 | 0 |
| 79 | 2,3,5,6-tetrachlorophenyl-NH-NO₂ | 3 / 1 | 8 / 7 | 9 / 8 | 9 / 7 | 9 / 8 |

TABLE V—Continued

| Ex. No. | Active ingredient | Rate, lb./acre | KO | LA | MU | PI |
|---|---|---|---|---|---|---|
| 80 | 2,3,5,6-tetrachloro-N-Ba1/2·H₂O, NO₂ | 2 / 1 | 3 / 3 | 8 / 6 | 9 / 8 | 9 / 9 |
| 81 | pentachloro-NH—NO₂ | 3 / 1 | 4 / 0 | 6 / 4 | 4 / 0 | 4 / 4 |
| 82 | 2,6-dichloro-NH—NO₂ | 1 / ½ | 9 / 8 | 9 / 8 | 9 / 9 | 9 / 9 |
| 83 | 3,4-dichloro-NH—NO₂ | 1 / ½ | 8 / 8 | 9 / 8 | 9 / 9 | 9 / 7 |
| 84 | 2,5-dichloro-NH—NO₂ | 1 | 8 | 8 | 9 | 8 |
| 85 | 2,4-dichloro-NH—NO₂ | 1 | 2 | 5 | 6 | 8 |
| 86 | 2,6-dimethyl-NH—NO₂ | 1 / ½ | 8 / 7 | 8 / 8 | 9 / 9 | 9 / 9 |
| 87 | 2,4,6-trimethyl-NH—NO₂ | 2 / 1 | 1 / 0 | 5 / 0 | 4 / 4 | 8 / 3 |

EXAMPLES 88–92

Postemergence Herbicidal Activity

The postemergence activity of the phenylnitramines of the present invention is further demonstrated by the following tests. In these tests, seedling plants of kochia, lambsquarter, mustard and pigweed are sprayed with 50/50 acetone/water solutions or dispersions of test compound in sufficient amount to provide the equivalent of 0.5 or 1 pound of active ingredient per acre. The treated plants are then placed on greenhouse benches and cared for as described in Example 11 above. From the data obtained and provided in Table VI below, it can be seen that the compounds of the invention provide nearly complete control of the above-mentioned weed species at about 0.5 or 1.0 pounds of active ingredient per acre. The data also show that 2,6-dibromophenylnitramine is markedly superior to 2,4,6-tribromophenylnitramine against the weed species employed in these tests.

TABLE VI

| Ex. No. | Active ingredient | Rate, lb./acre | KO | LA | MU | PI |
|---|---|---|---|---|---|---|
| 88 | 2,6-dibromo-NH—NO₂ | 1 | 7 | 9 | 9 | 4 |
| 89 | 2,4,6-tribromo-NH—NO₂ | 1 | 1 | 3 | 6 | 3 |
| 90 | 2,3,5,6-tetrachloro-NH—NO₂ | 1 / ½ | 9 / 8 | 8 / 4 | 9 / 9 | 9 / 9 |
| 91 | 2,6-dimethyl-NH—NO₂ | 1 | 8 | 9 | 9 | 4 |
| 92 | 2,3,5,6-tetrachloro-N—Ba1/2·H₂O, NO₂ | 1 / ½ | 8 / 8 | 9 / 9 | 9 / 9 | 8 / 8 |

We claim:

1. A method for the postemergence control of undesirable broadleaf plant species comprising applying to the foliage of the plant species a herbicidally effective amount of a phenylnitramine having the formula:

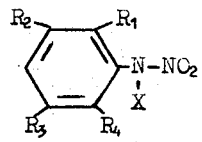

wherein the R groups: $R_1$, $R_2$, $R_3$, and $R_4$ each represent hydrogen, halogen, loweralkyl $C_1$–$C_4$, carboxy or nitro; provided that at least two of the R groups are substituents other than hydrogen; and X is hydrogen, loweralkyl $C_1$–$C_4$, loweralkoxyloweralkyl wherein the hydrocarbon portions of the group are both in the range of $C_1$–$C_4$, arloweralkyl wherein the loweralkyl portion of the group is in the range of $C_1$–$C_4$, alkali metals, alkaline earth metals, or the N-ammonium derivatives; provided that where an R group is carboxy, X is hydrogen.

2. A method according to claim 1 wherein $R_2$ and $R_3$ are hydrogen.

3. A method according to claim 1 wherein the compound is 2,3,5,6-tetrachlorophenylnitramine.

4. A method according to claim 1 wherein the compound is 2,6-dibromophenylnitramine.

5. A method for the preemergence control of undesirable plant species comprising applying to soil containing seeds of said undesirable plants a herbicidally effective amount of a compound of claim 1.

6. A method according to claim 5 wherein $R_2$ and $R_3$ are hydrogen.

7. A method according to claim 5 wherein the compound is 2,3,5,6-tetrachlorophenylnitramine.

8. A method according to claim 5 wherein the compound is 2,6-dibromophenylnitramine.

* * * * *